No. 608,505. Patented Aug. 2, 1898.
C. R. BINNEY.
MEANS FOR PREVENTING VIBRATION IN VEHICLES.
(Application filed Nov. 16, 1897.)
(No Model.)

Witnesses:
Lloyd Mortimer Howell.
W. H. Pumphrey.

Inventor,
Charles Richard Binney
by H. S. MacKaye
Attorney.

UNITED STATES PATENT OFFICE.

CHARLES RICHARD BINNEY, OF LONDON, ENGLAND, ASSIGNOR TO WILLIAM N. AMORY, OF NEW YORK, N. Y.

MEANS FOR PREVENTING VIBRATION IN VEHICLES.

SPECIFICATION forming part of Letters Patent No. 608,505, dated August 2, 1898.

Application filed November 16, 1897. Serial No. 658,716. (No model.) Patented in England June 8, 1893, No. 11,364.

*To all whom it may concern:*

Be it known that I, CHARLES RICHARD BINNEY, a subject of the Queen of Great Britain and Ireland, residing in London, England, have invented certain new and useful Improvements in Means for Preventing Vibrations in Vehicles, (for which I have received Letters Patent in England, No. 11,364, dated June 8, 1893, accepted May 12, 1894,) of which the following is a specification.

My invention relates to an improvement in bicycles and other vehicles whereby the rider is protected from practically all the vibrations incident to the roughness of road traveled over.

The means employed prior to my invention for obviating shocks and annoying vibrations have been of such a nature as to take up the energy of impact (as by a spring, a solid block of rubber, or their equivalent) in substantially the line of direction of the impact delivered and by subsequent reaction deliver this energy in the form of movement of a gradual and comparatively gentle nature in the same line. Prior devices therefore have been rather palliatives than preventives. Moreover, such devices have always resulted in the production of a long swing or vibration of the saddle or other part supported, which, while less violent and exhausting, is quite as annoying and disagreeable to a rider as mere jolting.

By use of the form of cushion which I have invented, supported and controlled in its action by the means I have devised for this end, disagreeable shocks are destroyed and intercepted before reaching the saddle or other part to be protected. This occurs through the rapid expansion of an easily-distended air-cushion, which distention takes place in radial directions, or nearly so. Thus the shocks are taken up without producing that swinging or balancing effect so disagreeably evident where mere spiral springs are used.

My invention is shown in the accompanying drawings, wherein—

Figure 1:
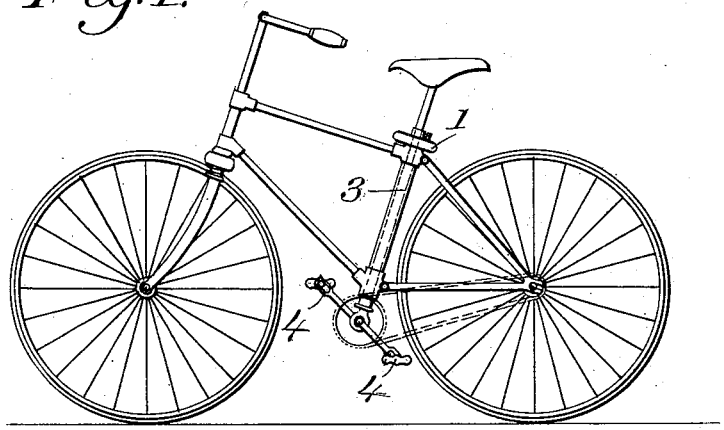
Figure 2:
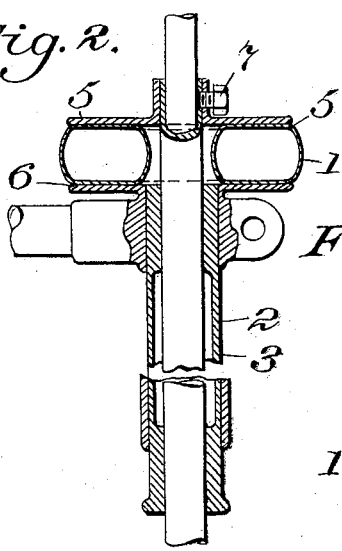
Figure 3:
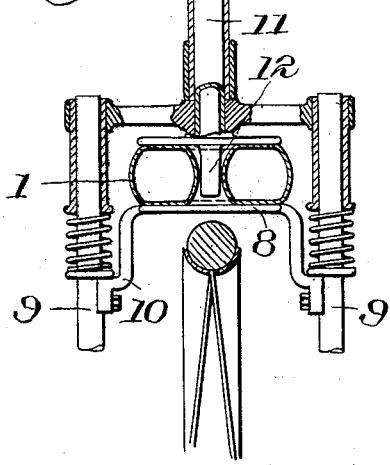

Figure 1 is a side view of a bicycle provided in two ways with my preferred form of cushion. Fig. 2 is a vertical section through the upper part of the saddle-post of the bicycle shown in Fig. 1, showing one way in which my invention may be embodied in its application to saddle-posts; and Fig. 3 is a sectional view through the junction of handle-bar and front-wheel fork, showing one way of applying my invention to handle-bars.

My invention is manifestly applicable to any vehicle in which it is desirable to destroy disagreeable vibrations, and I have shown it herein as applied to bicycles merely because it is peculiarly applicable to that class of vehicle.

In the drawings my air-cushion in its preferred form is shown at 1 as applied to the saddle of a bicycle. As is usual in bicycles, the saddle is supported by a stem or post 2, which enters the diagonal tube 3, and, as shown by the dotted lines in Fig. 1, I prefer to make this stem long enough so that the pedals 4 may be mounted at its lower extremity. This latter detail is not essential, however.

Where it is desired to use my preferred form of air-cushion in connection with a bicycle-saddle, a bearing-plate 5 is attached to the stem 2 and a supporting-plate 6 is attached to the guide in which such stem slides, which is usually the diagonal tube 3. This attachment of plates to stem or guide may be either adjustable, as by the screw 7, or permanent, as in the case of the plate 6, as shown in Fig. 2. The stem or post should of course fit loosely enough in its guide to slide easily therein.

The air-cushion itself is shown at 1 and surrounds the stem or post 2. I prefer to make this cushion substantially circular in form, although this is not an essential.

In operation the cushion is clipped between the bearing-plate 5, which is flat, and the supporting-plate 6, which is also flat, in such a manner as to be free to expand without any restriction in the plane of its circumference. Thus shocks which are transmitted upwardly through the supporting-plate 6 are taken up substantially horizontally by virtue of the stretching of the yielding walls of the cushion 1. While I prefer the flat form of plate 5 and 6, as shown, any form that will permit of expansion as above described comes within my invention.

The combination of the cushion shown with the non-confining plates enables me to avail myself of the tensional resilience of the rubber by transmitting the original shock through the air at right angles to its original direction, and thus gain a much greater advantage than from the compressive resilience of the rubber, which is almost *nil*.

Where applied to the handle-bar, the same principle of compression of the cushion between non-confining plates should be observed, and in Fig. 3 I have shown one way of accomplishing this by carrying the supporting-plate 8 upon the forks 9 by any means, such as the arms 10. The handle-bar stem is shown at 11 and is preferably extended, as at 12, to retain the cushion 1 in place.

It will be evident that my invention is capable of application in a variety of forms to various parts of bicycles and other vehicles, and I do not wish to be understood as limiting myself to the exact details herein shown and described.

What I claim is—

1. In means for preventing vibrations in vehicles, a bearing-plate, a supporting-plate and a hollow distendable air-cushion unconfined between them so placed that the air-pressure at right angles to the line of shock may be free to cause the walls of said cushion to stretch and thus render the tensional resilience of said walls available.

2. In means for preventing vibrations in vehicles, a sliding standard, a guide therefor, a bearing-plate and a supporting-plate respectively secured to such standard and guide, and an unconfined hollow distendable air-cushion surrounding said standard between said plates and so placed that the air-pressure at right angles to the line of shock may be free to cause the walls of said cushion to stretch and thus render the tensional resilience of said walls available.

3. In means for preventing vibrations in vehicles, a lower member connected to the running-gear, and an upper member connected to the carrying part of the vehicle, said members being telescoped one within the other; in combination with a plate attached to each member and a distendable air-cushion surrounding one member and so placed that the air-pressure at right angles to the line of shock may be free to cause the walls of said cushion to stretch and thus render the tensional resilience of said walls available as described.

4. In a bicycle having the usual diagonal tubing, a saddle provided with a post or standard adapted to slide within said tubing, a bearing-plate secured to said post, a supporting-plate secured to said diagonal tube, and a distendable air-cushion surrounding said post and so placed that the air-pressure at right angles to the line of shock may be free to cause the walls of said cushion to stretch, and thus render the tensional resilience of said walls available.

CHARLES RICHARD BINNEY.

Witnesses:
RICHARD BARNARD,
EDWARD WHITEMAN.